(12) United States Patent
Suh

(10) Patent No.: US 6,742,065 B1
(45) Date of Patent: May 25, 2004

(54) INTERRUPT CONTROLLER AND METHOD OF ACCESSING INTERRUPTS

(75) Inventor: Woon-Sig Suh, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 417 days.

(21) Appl. No.: 09/676,113

(22) Filed: Sep. 29, 2000

(30) Foreign Application Priority Data

Oct. 1, 1999 (KR) ......................................... 1999-42354

(51) Int. Cl.$^7$ .............................................. G06F 13/24
(52) U.S. Cl. .................... 710/260; 710/261; 710/262
(58) Field of Search ................................ 710/260, 261, 710/262, 263, 264, 265, 266, 267, 268, 269

(56) References Cited

U.S. PATENT DOCUMENTS

| | | | |
|---|---|---|---|
| 4,200,912 A | * | 4/1980 | Harrington et al. ......... 710/269 |
| 4,523,277 A | | 6/1985 | Schnathorst |
| 5,701,493 A | * | 12/1997 | Jaggar ........................ 710/261 |
| 6,070,220 A | | 5/2000 | Katayama |
| 6,298,410 B1 | * | 10/2001 | Jayakumar et al. ......... 710/266 |

FOREIGN PATENT DOCUMENTS

| | | |
|---|---|---|
| EP | 1063588 | 12/2000 |
| GB | 2012082 | 7/1979 |
| JP | 10171665 | 6/1998 |

OTHER PUBLICATIONS

Search Report of Great Britain Application No. GB 0023920.2.

* cited by examiner

*Primary Examiner*—Tim Vo
(74) *Attorney, Agent, or Firm*—F. Chau & Associates LLC

(57) ABSTRACT

An interrupt controller and an interrupt handling method thereof are described. When there is an interrupt, a priority level of an interrupt source is determined and a corresponding branch instruction is generated and inputted to a CPU. The CPU then directly branches off to a position containing an interrupt service routine addressed by the inputted branch instruction instead of a general CPU instruction, similar to interrupt handling in CISCs with vectored interrupts. Therefore, interrupt handling time is reduced.

10 Claims, 7 Drawing Sheets

Fig. 7

| Interrupt Source | Master ID | Slave ID | IRQ Instruction | FIQ Instruction |
|---|---|---|---|---|
| 00 | 000 | 000 | EA000000 | EAFFFFFF |
| 01 | 000 | 001 | EA000001 | EA000000 |
| 02 | 000 | 010 | EA000002 | EA000001 |
| 03 | 000 | 011 | EA000003 | EA000002 |
| 04 | 000 | 100 | EA000004 | EA000003 |
| 05 | 000 | 101 | EA000005 | EA000004 |
| 06 | 001 | 000 | EA000008 | EA000007 |
| 07 | 001 | 001 | EA000009 | EA000008 |
| 08 | 001 | 010 | EA00000A | EA000009 |
| 09 | 001 | 011 | EA00000B | EA00000A |
| ... | ... | ... | ... | ... |
| 18 | 011 | 000 | EA000018 | EA000017 |
| 19 | 011 | 001 | EA000019 | EA000018 |
| 20 | 011 | 010 | EA00001A | EA000019 |
| 21 | 011 | 011 | EA00001B | EA00001A |
| 22 | 011 | 100 | EA00001C | EA00001B |
| 23 | 011 | 101 | EA00001D | EA00001C |
| 24 | 100 | 000 | EA000020 | EA00001F |
| 25 | 101 | 000 | EA000028 | EA000027 |

INTERRUPT CONTROLLER AND METHOD OF ACCESSING INTERRUPTS

This application claims priority to Korean Patent Application No. 1999-42354, filed on Oct. 1, 1999, the contents of which are herein incorporated by reference in their entirety.

FIELD OF THE INVENTION

The present invention relates to interrupt controllers for computer systems and, more particularly, to interrupt controllers for use in reduced instruction set computers (RISCs).

BACKGROUND OF THE INVENTION

Generally, computers utilizing microprocessors manufactured by Intel Corporation, such as the 8088, 8086, 80186, 80286, i386™, and i486™ also utilize Intel 8259 series programmable interrupt controllers. The 8259 series controllers are described in detail in "Microprocessor and Peripheral Handbook" published by Intel, pages 3–171, October 1988. An 8259 interrupt controller provides interrupt signals to a processor for handling various hardware devices associated with the processor. Other programmable controllers are disclosed, for example, in U.S. Pat. No. 5,481,725, entitled "METHOD FOR PROVIDING PROGRAMMABLE INTERRUPT FOR EMBEDDED HARDWARE USED WITH PROGRAMMABLE INTERRUPT CONTROLLERS" issued to Jayakumar et al. on Aug. 3, 1993, and in U.S. Pat. No. 5,603,035 entitled "PROGRAMMABLE INTERRUPT CONTROLER, INTERRUPT SYSTEM AND ITNERRUPT CONTROL PROCESS" issued to Erramoun et al. on May 27, 1994.

An interrupt accessing procedure is generally divided into two manners. One is "vectored interrupt", wherein an interrupt controller informs a central processing unit (CPU) of a vector that is an intrinsic number of each interrupt source. The CPU processes an interrupt service routine corresponding to the vector sent from the interrupt controller, by jumping to a memory location containing the service routine. The other is "non-vectored interrupt", wherein an interrupt controller informs a CPU of only the fact that an interrupt has occurred. In this case, an interrupt source and a location of an interrupt service routine corresponding to the interrupt source is determined by software.

In a reduced instruction set computer (RISC) such as the ARM CPU series produced by Advanced RISC Machines (ARM) Ltd. which supports non-vectored interrupts, when an interrupt occurs, an interrupt accessing procedure is performed as illustrated in FIG. 1.

Referring to FIG. 1, which shows a conventional interrupt accessing procedure of an RISC system, when an interrupt controller 2 generates an interrupt signal INT, a CPU 1 acknowledges that and jumps to an exception vector table via arrow (a). The exception vector table is a nonvolatile memory and a branch instruction such as B ISR_0 is stored therein by a programmer. According to the branch instruction BISR_0, the CPU 1 jumps to a routine ISR_0, via arrow (b), and checks which of interrupt sources is0, is1, . . . , and isn was the source that made the interrupt request. By executing the routine ISR_0, the CPU addresses the interrupt controller 2, and then detects the interrupt request stored in an interrupt pending register therein. Thereafter, control flow jumps via arrow (c) to a position where an interrupt service routine for performing the interrupt request is located.

A problem of the RISCs supporting non-vectored interrupts described above is low interrupt handing speed because of the addressing step needed to detect the presence of the interrupt request. Therefore, a need exists for an interrupt controller and an interrupt handling method capable of improving the interrupt handling speed.

SUMMARY OF THE INVENTION

It is an object of the present invention to provide an interrupt controller and an interrupt accessing method capable of reducing interrupt accessing time of RISCs that does not support vectored interrupts.

According to an aspect of the present invention, an interrupt controller comprises: first storing unit for storing an interrupt request of a plurality of interrupt sources; a priority determination unit, for determining a priority level of each of the interrupt sources and generating one or more indexes and one or more interrupt signals, in response to the interrupt request; a vector generator for generating one or more vectors in response to the indexes; second storing unit for storing the one or more vectors; an instruction generator for generating a branch instruction in response to the one or more vectors, and selecting either the generated branch instruction or a CPU instruction for outputting to a CPU; and a control logic for controlling overall operations of the interrupt controller.

According to another aspect of the present invention, there is a method of accessing interrupts in an RISC. The method comprises the steps of: checking whether an interrupt request is made by an embedded device; finding out a final interrupt source by determining a priority level of the interrupt source; generating a branch instruction corresponding to the determined priority level; generating an interrupt signal to a CPU; inputting the branch instruction to the CPU in response to the interrupt signal; and processing an interrupt service routine addressed by the branch instruction.

BRIEF DESCRIPTION OF THE DRAWINGS

FIG. 7 shows exemplary instructions generated from the instruction generator shown in FIG. 3.

DESCRIPTION OF THE PREFERRED EMBODIMENT

A new and improved interrupt controller and an interrupt accessing method of the interrupt controller will be described more fully hereinafter with reference to attached drawings.

When there is an interrupt request, a priority level of an interrupt source is determined with hardware circuitry and a branch instruction corresponding thereto is generated. The CPU receives the generated branch and causes a jump to a position containing an interrupt service routine. This is similar to interrupt accessing for CISCs with vectored interrupts. As a result, interrupt accessing time of RISCs without the vectored interrupts would be also reduced by means of the interrupt accessing feature of the invention.

Figure 1:
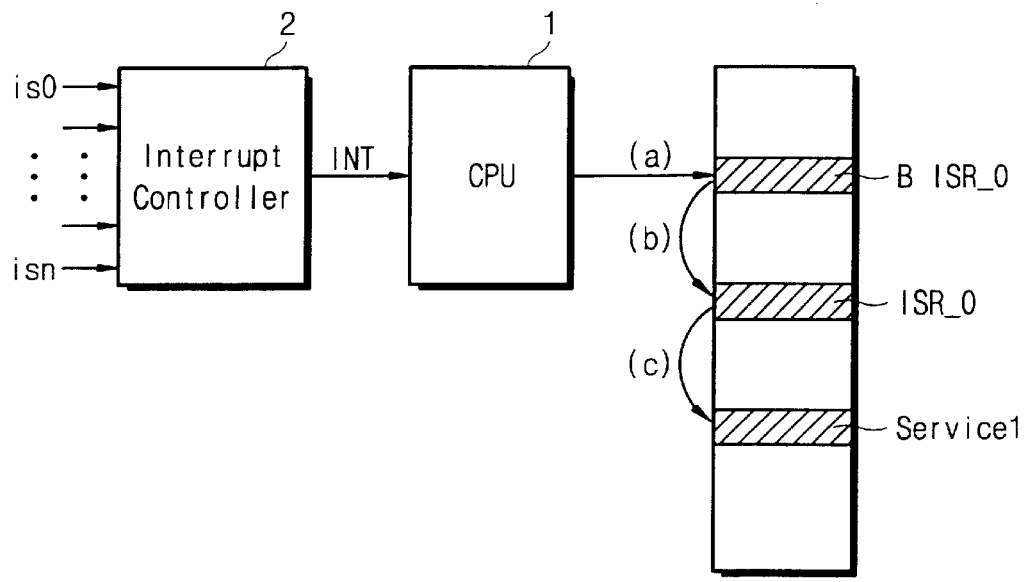
FIG. 1 shows a prior art interrupt accessing procedure of RISCs.
Figure 2:
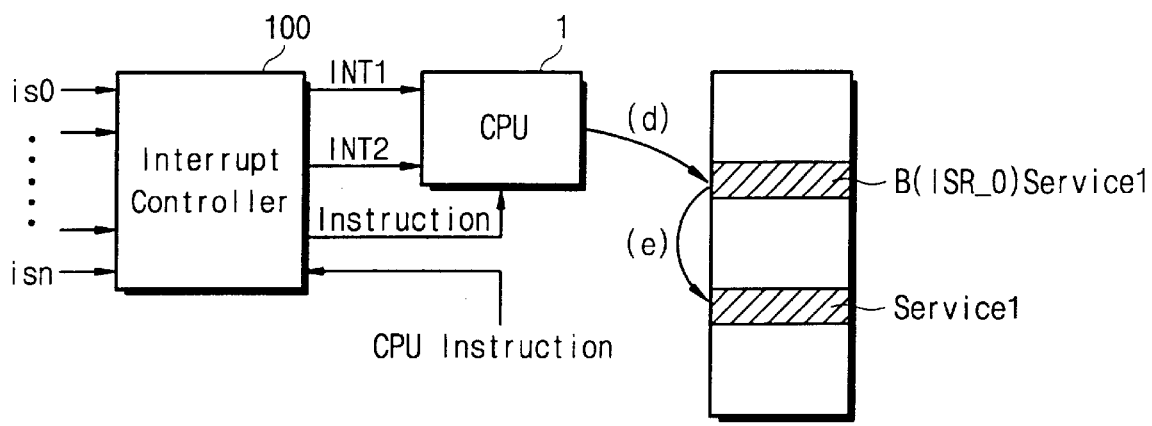
FIG. 2 shows an interrupt accessing procedure of RISCs in accordance with the present invention.

FIG. 2 illustrates an interrupt handling procedure of RISCs in accordance with the present invention. Referring to FIG. 2, when an interrupt request is inputted to the interrupt controller 100 through one of the interrupt sources is0, is1, . . . , and isn, an interrupt controller 100 generates an IRQ (interrupt request) interrupt signal INT1 or an FIQ (fast interrupt request) interrupt signal INT2 to CPU 1.

When interrupt signal INT1 or INT2 is applied to CPU 1, which jumps to an exception vector table as indicated by arrow (d). A CPU instruction such as B ISR_0 is stored in the exception vector table. According to the present invention, a read-out operation for the CPU instruction is performed through a multiplexer of an instruction generating unit in the interrupt controller 100, and then CPU 1 accepts a branch instruction Instruction such as B Service1 generated from the interrupt controller 100 instead of the B ISR_0 from the exception vector table. Therefore, CPU 1 jumps directly to an interrupt service routine Service1 corresponding to an interrupt source as shown by arrow (e). The symbol B (ISR_0) Service1 means that the CPU 1 accepts the instruction B Service1 instead of B ISR_0.

Advantageously, the speed of the interrupt accessing procedure discussed above operates in similar manner as CISCs which support vectored interrupts and interrupt accessing speed is improved.

Figure 3:
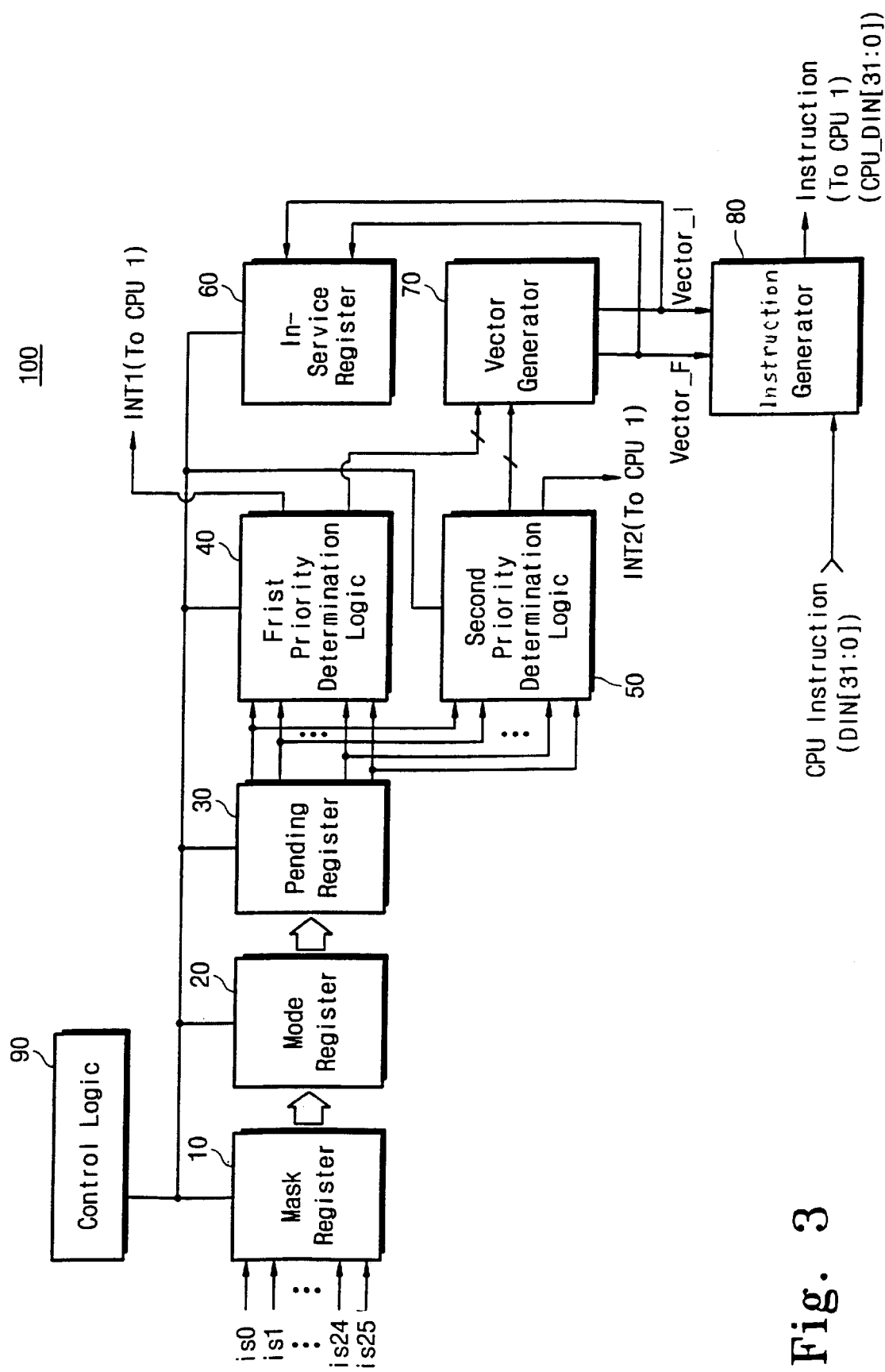
FIG. 3 shows a block diagram of an interrupt controller in accordance with a preferred embodiment of the invention.

FIG. 3 illustrates a structure of the interrupt controller 100 in accordance with a preferred embodiment of the invention. Referring now to FIG. 3, an interrupt controller 100 includes a mask register 10, a mode register 20, a pending register 30, a first priority determination logic 40, a second priority determination logic 50, an in-service register 60, a vector generator 70, an instruction generator 80, and a control logic 90.

The mask register 10 determines whether an interrupt request of each source is cut off or permitted. The cut-off or permission thereof is determined by a user. If there are two or more interrupt modes like an IRQ mode and an FIR mode, the mode register 20 makes a determination depending upon a corresponding mode. The pending register 30, which stores an interrupt state, is used for storing a requisition state of each interrupt source.

The first and second priority determination logics 40 and 50 are coupled to the pending register 30 in parallel. The first logic 40 determines a priority level of a plurality of interrupt sources with logic circuit, generating indexes for generating an IRQ vector Vector_I and an IRQ interrupt signal INT1. The second logic 50 determines a priority level of a plurality of interrupt sources with logic circuit, generating indexes for generating an FIQ vector Vector_F and an FIQ interrupt signal INT2. All indexes Index_A_I, Index_B_I, . . . , Index_C_F, Index_D_F, and Index_M_F generated from the first and second logics 40 and 50 are applied to the vector generator 70 so as to generate the vectors Vector_I and Vector_F. An alternative one of the interrupt signals INT1 and INT2 generated from the first and second logics 40 and 50 is applied to the CPU 1 to inform the CPU of the presence of an interrupt request. The first and second logics 40 and 50 adopt a priority level determination method using round robin arbiters. The determination method is user modifiable.

The vector generator 70 generates an IRQ vector Vector_I or an FIQ vector Vector_F in response to the generated indexes Index_A_I~Index_M_I, or Index_A_F~Index_M_F. The vectors Vector_I or Vector_F is applied to the in-service register 60 and the instruction generator 80, respectively.

The in-service register 60 stores the vector Vector_I or Vector F as information of a finally determined interrupt source. In this case, only one of the plural interrupt sources is selectively stored therein. When there is no interrupt request, the instruction generator 80 selects and outputs a general CPU instruction CPU Instruction to the CPU 1 in response to the generated IRQ vector Vector_I or FIQ vector Vector_F from the vector generator 70. When there is an interrupt request, the instruction generator 80 converts and outputs the vectors Vector_I or Vector_F into a branch instruction. This causes a direct branch of the CPU 1 in accordance with the branch instruction. An output of the instruction generator 80 is selected by a plurality of signals CPU_nM, CPU_A, CPU_OPC, CPU_NIRQ, and CPU_NFIQ generated from the CPU 1 and a signal Vector_Mode informing an interrupt state. The control logic 90 is used for controlling the overall operations of the interrupt controller 100.

As mentioned above, if service based upon a priority level of the hardware is determined, the interrupt controller 100 convert vectors Vector_I or Vector_F of corresponding sources into a branch instruction, and then supplies the branch instruction to the CPU 1. Therefore, the CPU 1 can branch off to a corresponding interrupt execution routine in accordance with the branch instruction. The structure and operations of the first and second priority determination logics 40 and 50 will be explained in detail as follows.

Figure 4:
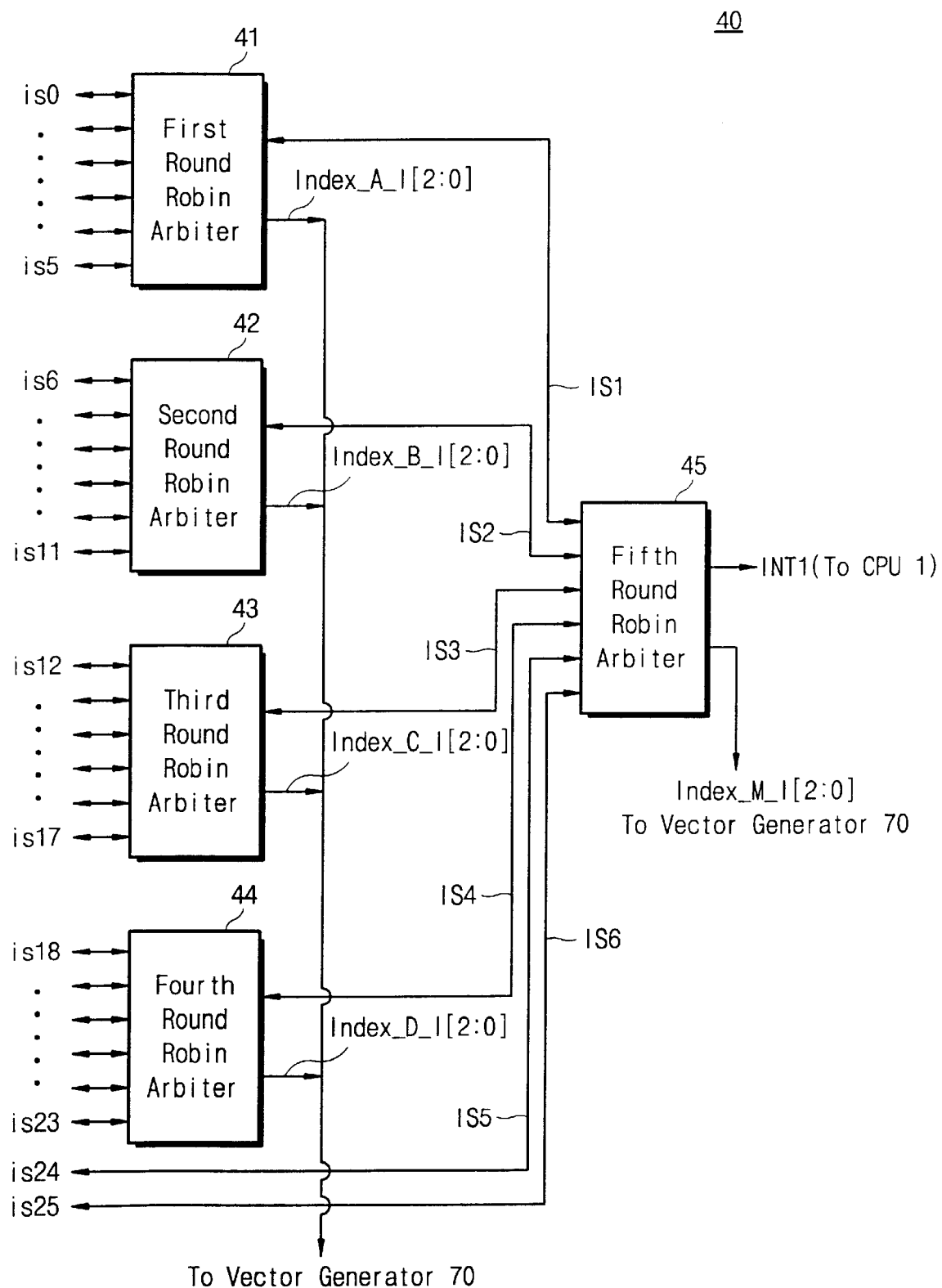
FIG. 4 shows a block diagram of the first priority determination logic shown in FIG. 3.

FIG. 4 illustrates a structure of the first priority determination logic 40 shown in FIG. 3. Referring to FIG. 4, the first priority determination logic 40 generates indexes for composing an IRQ vector Vector_I with a result of determining a priority level of interrupt sources. The first logic 40 includes a first to fourth round robin arbiters 41~44 and a fifth round robin arbiter 45. The first to fourth arbiters 41~44 receive six interrupt sources is0_is5, is6_is11, . . . , and is17_is23 as input signals, respectively. The fifth arbiter 45 receives two interrupt sources is24 and is25 as six interrupt sources IS1~IS6. The first to fourth arbiters 41~44 are coupled to the fifth arbiters 45 in cascade.

Each of the first to fourth round robin arbiters 41–44 determines a priority level of inputted interrupt sources, and then outputs indexes Index_A_I, Index_B_I, Index_C_I, and Index_D_I of interrupt sources corresponding to the determined priority level to the fifth arbiter 45 and the vector generator 70.

The fifth robin round arbiter 45 receives the generated indexes Index_A_I, Index_B_I, Index_C_I, and Index_D_I from the first to fourth round robin arbiters 41~44 as first to fourth interrupt sources IS1~IS4, and receives fifth and sixth interrupt sources IS5 and IS6, which do not pass through a round robin arbiter, as input signals. The fifth and sixth interrupt sources IS5 and IS6 are remaining inputs. In operation, a priority level of the fifth arbiter 45 is determined by one of the sources IS1~IS4. That is, the fifth arbiter 45 determines a priority level from the interrupt sources IS1~IS4, of which a priority level is already determined, one more time. Then, the fifth arbiter 45 outputs an index Index_M_I of an interrupt source selected by determining a highest priority level and forwards to the vector generator 70, and generates an IRQ interrupt signal INT1 and forwards to the in-service register 60. The index Index_$M_I$_I is used as a master ID for indicating an intrinsic number of a finally determined interrupt source.

The operation and structure of the first priority determination logic 40 and the second priority determination logic 50 are the same, except the first priority logic generates an IRQ and the second priority logic generates a FIQ signal.

Figure 5:
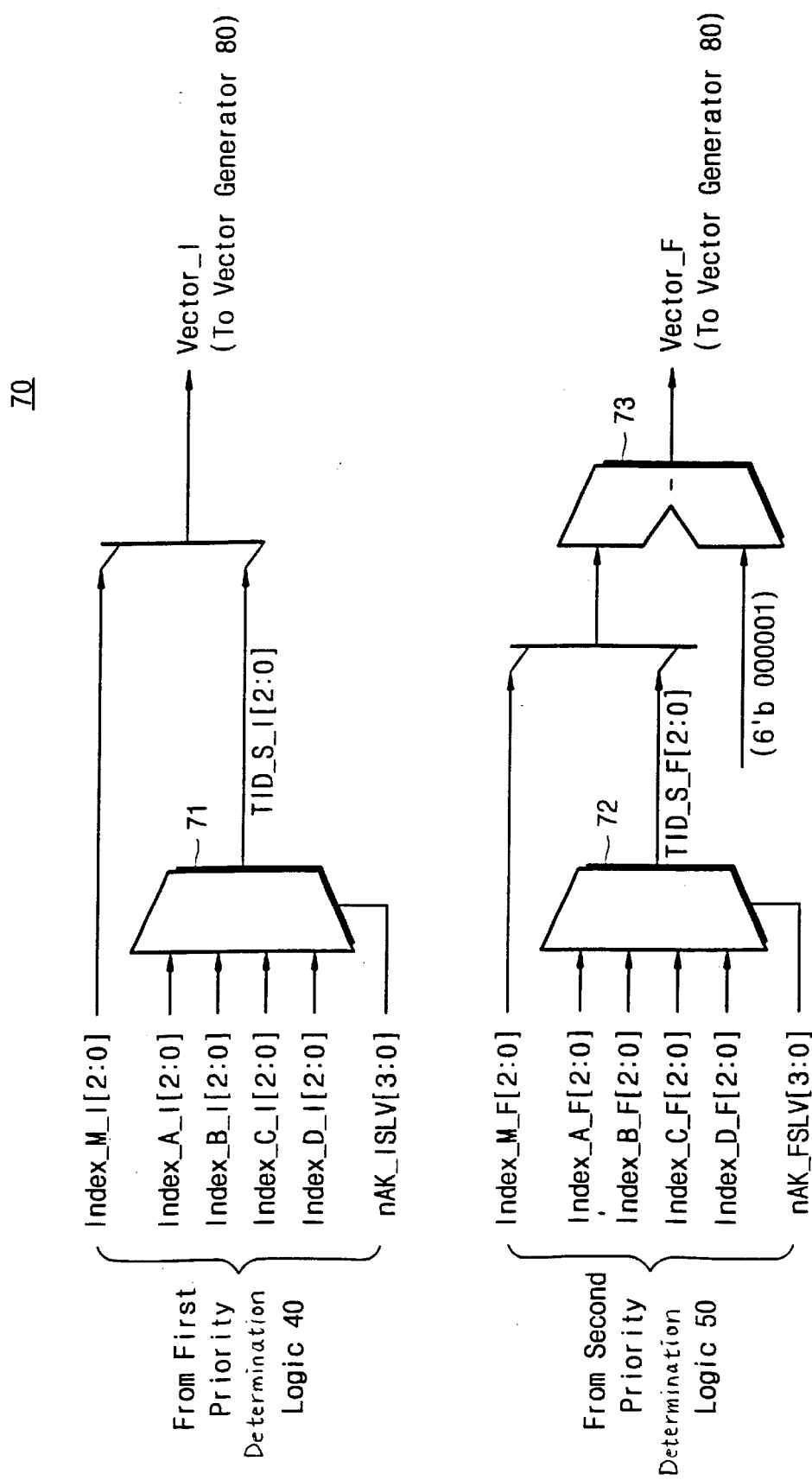
FIG. 5 shows a block diagram of the vector generator shown in FIG. 3.

Referring now to FIG. 5, a vector generator 70 includes a first multiplexer 71 and a second multiplexer 72. The first multiplexer 71 outputs one of indexes Index_A_I, Index_B_I, Index_C_I, and Index_D_I generated from the first priority determination logic 40 to a slave ID. The second multiplexer 72 outputs one of indexes Index_A_F, Index_B_F, Index_C_F, and Index_D_F generated from the second priority determination logic 50 to a master ID.

The vector generator 70 outputs an IRQ vector Vector_I, which is generated by combining the slave ID with the master ID, to an instruction generator 80. A selection signal for controlling an output of the first multiplexer 71 uses a first selection confirm signal nAK_ISLV for informing the fact that a corresponding source is finally selected when a highest priority level is determined by the first priority determination logic 40.

The vector generator 70 outputs an FIQ vector Vector_F, which is generated by subtracting "1" from the combination of the slave ID with the master ID, to the instruction generator 80. A selection signal for controlling an output of the second multiplexer 72 uses a second selection confirm signal nAK_FSLV for informing the fact that a corresponding interrupt source is finally selected when a highest priority level is determined by the second priority determination logic 50. There is a difference of "1" between the FIQ vector Vector_F and IRQ vector Vector_I, which results from branch instruction characteristics of a reduced instruction set computer.

Figure 6:
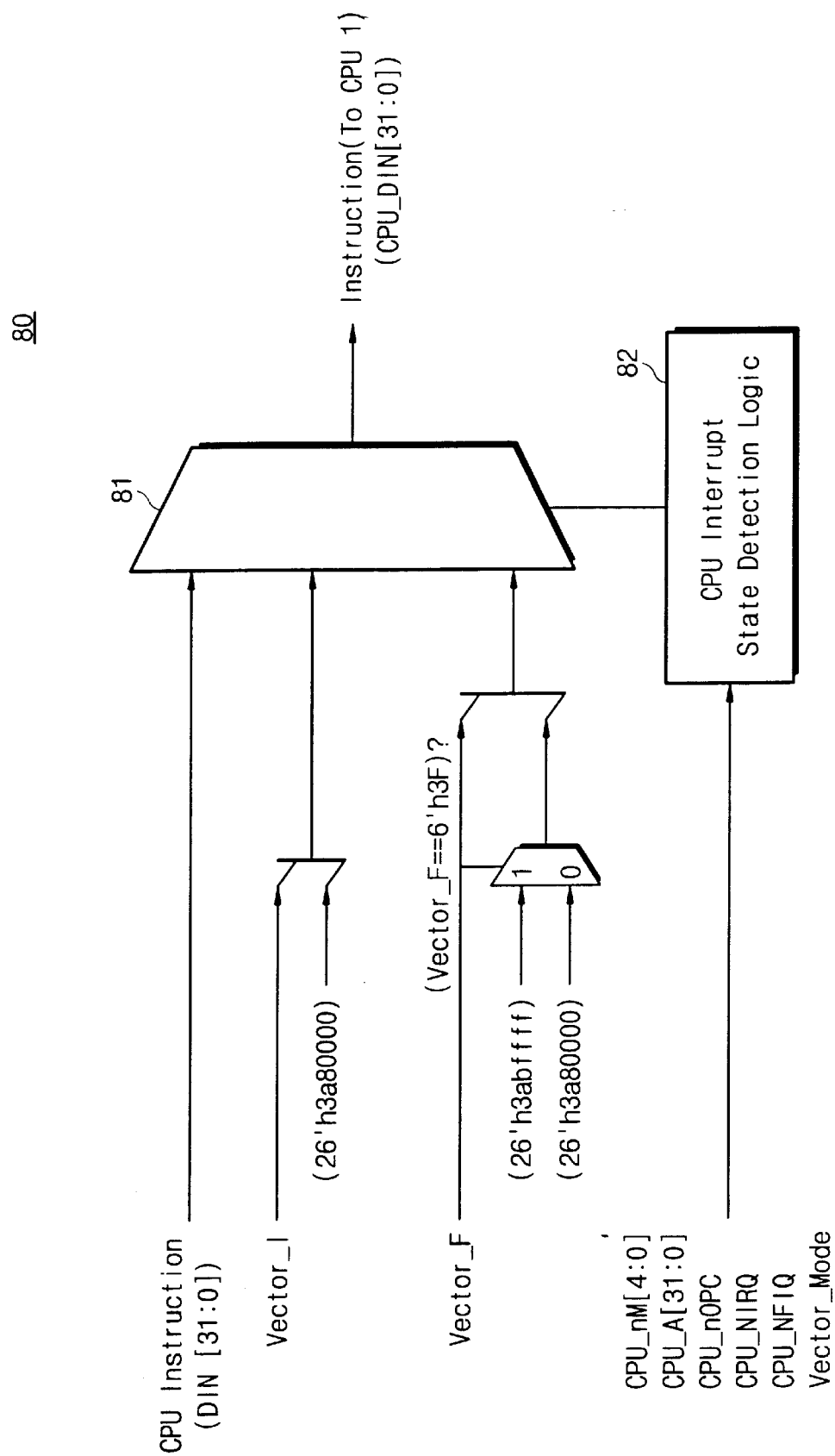
FIG. 6 shows a block diagram of the instruction generator shown in FIG. 3.

Referring now to FIG. 6, an instruction generator 80 generates an IRQ instruction or an FIQ instruction by combining an IRQ vector Vector_I and FIQ vector Vector_F generated from the vector generator 70 with "26'h3a80000" or "26'h3abffff", resulting in an instruction "EAxxxxxx" (see FIG. 7) for a reduced instruction set computer, respectively.

The instruction generator 80 selectively outputs one of the generated IRQ and FIQ instructions, and a general CPU instruction CPU Instruction. Therefore, the instruction generator 80 includes a multiplexer 81 that selectively outputs an instruction, and a CPU interrupt state detection logic 82 that generates a selection signal for selecting an instruction to output by the multiplexer 81. The CPU interrupt state detection logic 82 detects an interrupt state of a CPU 1 in response to a plurality of control signals CPU_nM, CPU_A, CPU_NIRQ, and CPU_NFIQ generated from the CPU 1 and a signal informing an interrupt state, and then generates a selection signal for selecting an output of the multiplexer 81.

Referring now to FIG. 7, an instruction generator 80 of an interrupt controller 100 generates the interrupt instruction IRQ or FIQ. The interrupt controller 100 receives a total of twenty-six interrupt sources having serial numbers from "00" to "25" as inputs. If one of the interrupt sources is determined by the first logic priority determination logic 40, vectors Vector_I and Vector_F are generated by a corresponding master ID and a corresponding slave ID. For example, if an interrupt source "05" is finally selected by the first priority determination logic 40, the IRQ vector Vector_I is generated with a type of "000101" and the FIQ vector Vector_F with a type of "000100" by combination of a corresponding master ID "000" with a corresponding slave ID "101". The generated IRQ vector Vector_I and FIQ vector Vector_F from the vector generator 70 are applied to the instruction generator 80, and then are converted into an IRQ instruction "EA000005" and an FIQ instruction "EA000004", respectively. While instructions shown in FIG. 7 are explained by exemplifying the ARM7TDMI CPU of ARM Ltd., one skilled in the art can readily appreciate that instructions applicable to any CPU of a reduced instruction set type can be employed in other embodiments of the present invention.

As shown in FIG. 7, in the ARM7TDM CPU, an interrupt mode has an IRQ mode and an FIQ mode. If both modes are applied to the present invention, an FIQ instruction is equal to an IRQ instruction by subtracting "1". This resulting from characteristics specific to the ARM7TDM1. One skilled in the art appreciates that other kinds of CPUs may lead to more or less different compositions of a master ID, a slave ID, a vector generator 70, and instruction generator 80.

Figure 8:
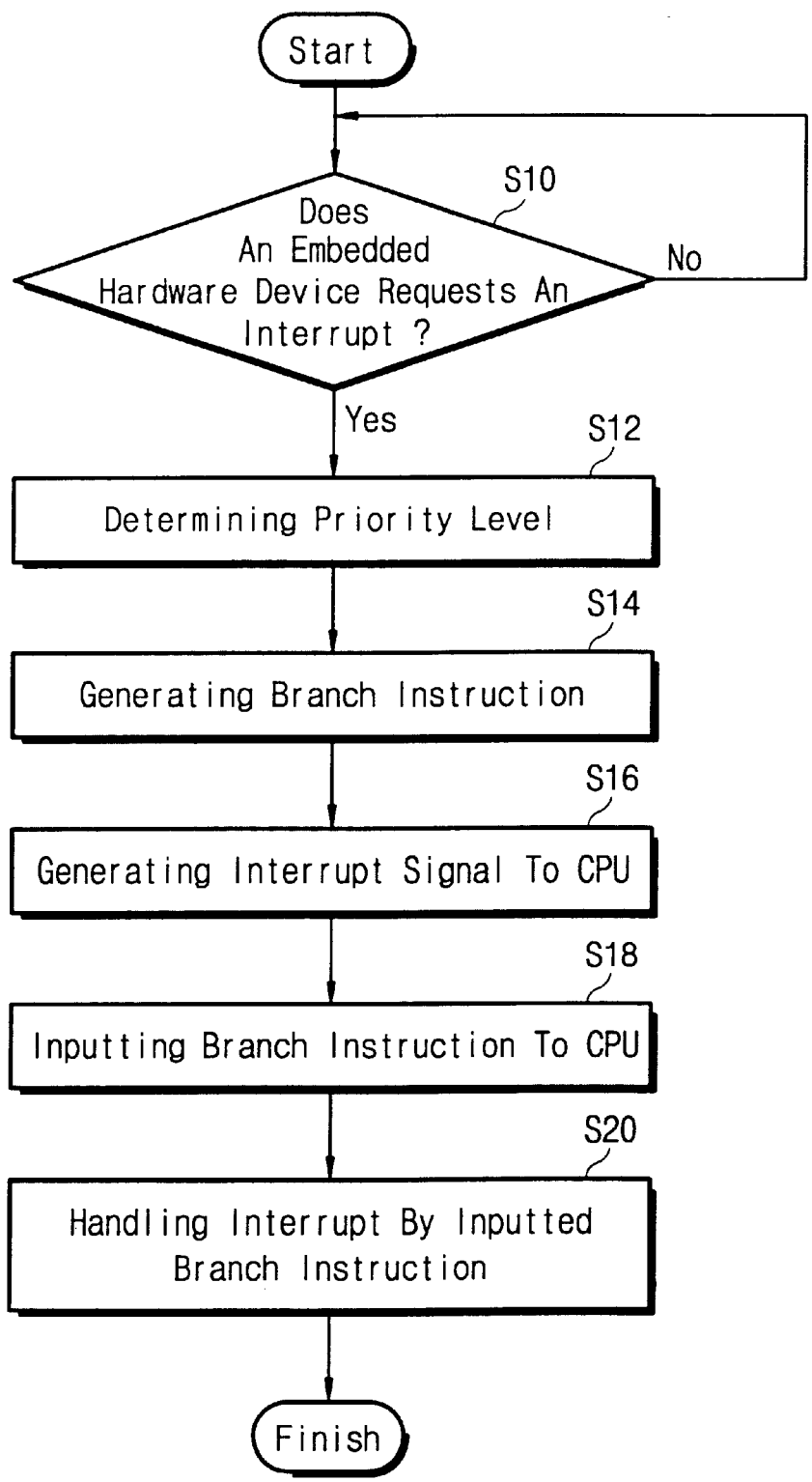
FIG. 8 is a flowchart showing interrupt accessing steps of an interrupt controller in accordance with the invention.

Referring now to FIG. 2 and FIG. 8, at step S10, it is determined whether an embedded hardware device requests an interrupt. If so, step S10 proceeds to step S12, wherein interrupt sources are inputted to first and second priority determination logics 40 and 50 via a mask register 10, a mode register 20, and a pending register 30. In step S12, the priority level is determined by selecting one of the inputted interrupt sources to the logics 40 and 50. And then, Vector Vector_I or Vector_F corresponding to the finally selected interrupt source is generated through a vector generator 70.

In step S14, as a branch instruction corresponding to the vector Vector_I or Vector_F, an IRQ instruction or an FIQ instruction is generated through an instruction generator 80. In step S16, interrupt signal INT1 or INT2 is applied to a CPU 1. The CPU 1 senses an interrupt in response to the interrupt signal INT1 or INT2. In step S18, the generated branch instruction (i.e., IRQ or FIQ) from the instruction generator 80 is applied to the CPU 1 instead of a general CPU instruction. In step S20, the CPU 1 directly goes to an interrupt service routine and processes the interrupt routine, without performing an additional processing step.

As a result, an interrupt controller 10 determines a priority level of interrupt sources with hardware and generates a branch instruction, reducing interrupt accessing time of reduced instruction set computers that do not support vectored interrupts.

While the invention has been described in terms of exemplary embodiments, it is contemplated that it may be practiced as outlined above with modifications within the spirit and scope of the appended claims.

What is claimed is:

1. An interrupt controller, comprising:
   first storing unit for storing an interrupt request received from one or more of a plurality of interrupt sources;
   a priority determination unit which is operatively coupled to the first storing unit, wherein the priority determination unit (i) determines a priority level of the interrupt sources to determine which interrupt request in the first storing unit has a highest priority, (ii) generates indexes based on a determined priority level of the interrupt sources and (iii) generates and outputs a non-vectored signal to a CPU to inform the CPU of an interrupt request;
   a vector generator for generating a vector based on indexes output from the priority determination unit, wherein the vector corresponds to an interrupt source having a highest priority;
   second storing unit for storing the vector output from the priority determination unit;

an instruction generator that converts the vector into a branch instruction that addresses an interrupt service routine, wherein the instruction register outputs the branch instruction or a CPU instruction to a CPU; and a control logic for controlling overall operations of the interrupt controller.

2. The interrupt controller as claimed in claim 1, wherein the vector generated from the vector generator comprises an IRQ vector or an FIQ vector.

3. The interrupt controller as claimed in claim 1, wherein the priority determination unit includes a first priority determination logic and a second priority determination logic, and wherein the first priority determination logic generates an IRQ signal as the non-vectored interrupt signal and the second priority determination logic generates an FIQ signal as the non-vectored interrupt signal.

4. The interrupt controller as claimed in claim 2, wherein the instruction generator includes:

a unit for generating an IRQ instruction or an FIQ instruction as the branch instruction in response to the IRQ vector or FIQ vector, respectively;

a multiplexer for selectively outputting the branch instruction or the CPU instruction to the CPU in response to a selection signal; and a detection logic for detecting an interrupt mode of the CPU and generating the selection signal for the multiplexer.

5. The interrupt controller as claimed in claim 3, wherein each of the first and second priority determination logics comprises a plurality of round robin arbiters for determining a priority level of inputted interrupt sources.

6. A method of interrupt accessing for reduced instruction set computers, the method comprising the steps of:

checking whether an interrupt request is made by an embedded device;

determining a priority level of sources of pending interrupt requests;

generating a branch instruction corresponding to the determined priority level;

generating a non-vectored interrupt signal to a CPU;

inputting the branch instruction to the CPU in response to a control signal received from the CPU; and processing an interrupt service routine addressed by the branch instruction.

7. The method as claimed in claim 6, wherein the branch instruction is applied to the CPU in the presence of an interrupt request, while a general instruction is applied to the CPU in the absence of an interrupt request.

8. A method of interrupt accessing for reduced instruction set computers, comprising the steps of:

requesting for an interrupt from one or more of a plurality of interrupt sources;

determining by an interrupt controller priority levels of the interrupt sources;

selecting a final interrupt source based on the priority levels;

generating by the interrupt controller a branch address based on the requested interrupt of the final interrupt source;

signaling a CPU with non-vectored interrupt signal and forwarding the branch address to the CPU from the interrupt controller; and processing an interrupt routine stored in a memory location addressed by the branch address.

9. The method according to claim 8, wherein the branch instruction is stored in a register in the interrupt controller and the interrupt control is stored in a nonvolatile memory.

10. The method according to claim 9, wherein the nonvolatile memory is an exception vector table.

* * * * *